US008140550B2

(12) United States Patent
Varadarajan et al.

(10) Patent No.: US 8,140,550 B2
(45) Date of Patent: Mar. 20, 2012

(54) SYSTEM AND METHOD FOR BOUNDED ANALYSIS OF MULTIMEDIA USING MULTIPLE CORRELATIONS

(75) Inventors: Sridhar Varadarajan, Bangalore (IN);
Amit Thawani, Bangalore (IN);
Kamakhya Prasad Gupta, Bangalore (IN)

(73) Assignee: Satyam Computer Services Limited of Mayfair Centre, Secunderabad (IN)

( * ) Notice: Subject to any disclaimer, the term of this patent is extended or adjusted under 35 U.S.C. 154(b) by 431 days.

(21) Appl. No.: 12/194,787

(22) Filed: Aug. 20, 2008

(65) Prior Publication Data
US 2010/0049739 A1 Feb. 25, 2010

(51) Int. Cl.
*G06F 7/00* (2006.01)
(52) U.S. Cl. ......................................................... 707/758
(58) Field of Classification Search .................. None
See application file for complete search history.

(56) References Cited

U.S. PATENT DOCUMENTS

| | | | |
|---|---|---|---|
| 6,366,296 B1 | 4/2002 | Boreczky et al. | |
| 6,941,321 B2 | 9/2005 | Schuetze et al. | |
| 7,184,959 B2 | 2/2007 | Gibbon et al. | |
| 7,305,389 B2 | 12/2007 | Zeng et al. | |
| 7,346,621 B2 | 3/2008 | Zhang et al. | |
| 7,778,469 B2 * | 8/2010 | Cooper et al. | 382/225 |

OTHER PUBLICATIONS

Claudia Hauff, et al., "The Effectiveness of Concept Based Search for Video Retrieval", Proceedings of Workshop Information Retrieval (FGIR 2007), Sep. 24-26, 2007, Halle, Germany.
Steven C.H. Hoi et al., "A Multimodal and Multilevel Ranking Framework for Content-Based Video Retrieval", Proceedings of the IEEE International Conference on ICASSP 2007 (Acoustics, Speech and Signal Processing, 2007), Honolulu, HI, Apr. 2007.
Wei Lai, et al., "Towards Content-Based Relevance Ranking for Video Search", Proceedings of ACM International Conference on Multimedia (ACM MM), Oct. 23-27, 2006, Santa Barbara, CA, USA.
Alejandro Jaimes, et al., "Modal Keywords, Ontologies, and Reasoning for Video Understanding", Proceedings of the International Conference on Image and Video Retrieval, Jul. 24-25, 2003, Urbana, II, USA.
Cees G.M. Snoek et al., "Multimodal Video Indexing: A Review of the State-of-the-Art", Technical Report 2001-20, Intelligent Sensory Information Systems Group, University of Amsterdam, 2001.

* cited by examiner

*Primary Examiner* — Truong Vo
(74) *Attorney, Agent, or Firm* — Merek, Blackmon & Voorhees, LLC

(57) ABSTRACT

Multimedia content usage is on the rise and hence, it is becoming increasingly necessary to automatically analyze the multimedia content in order enhance the effective applicability and usage of the content. The richness of a multimedia content demands multi-fold analysis of the content and further, this richness also leads to openness and vastness. Hence, the outcome of the multiple analyses techniques needs to be carefully analyzed in order to avoid limited or inconsistent content description. A system and method for bounded analysis of multimedia using multiple correlations addresses the issues related to richness and vastness of a multimedia content to enable describing of the multimedia content in a maximally consistent manner. Such a content description is very useful in the semantic characterization of multimedia.

8 Claims, 7 Drawing Sheets

AN ILLUSTRATIVE SCENE ANALYSIS

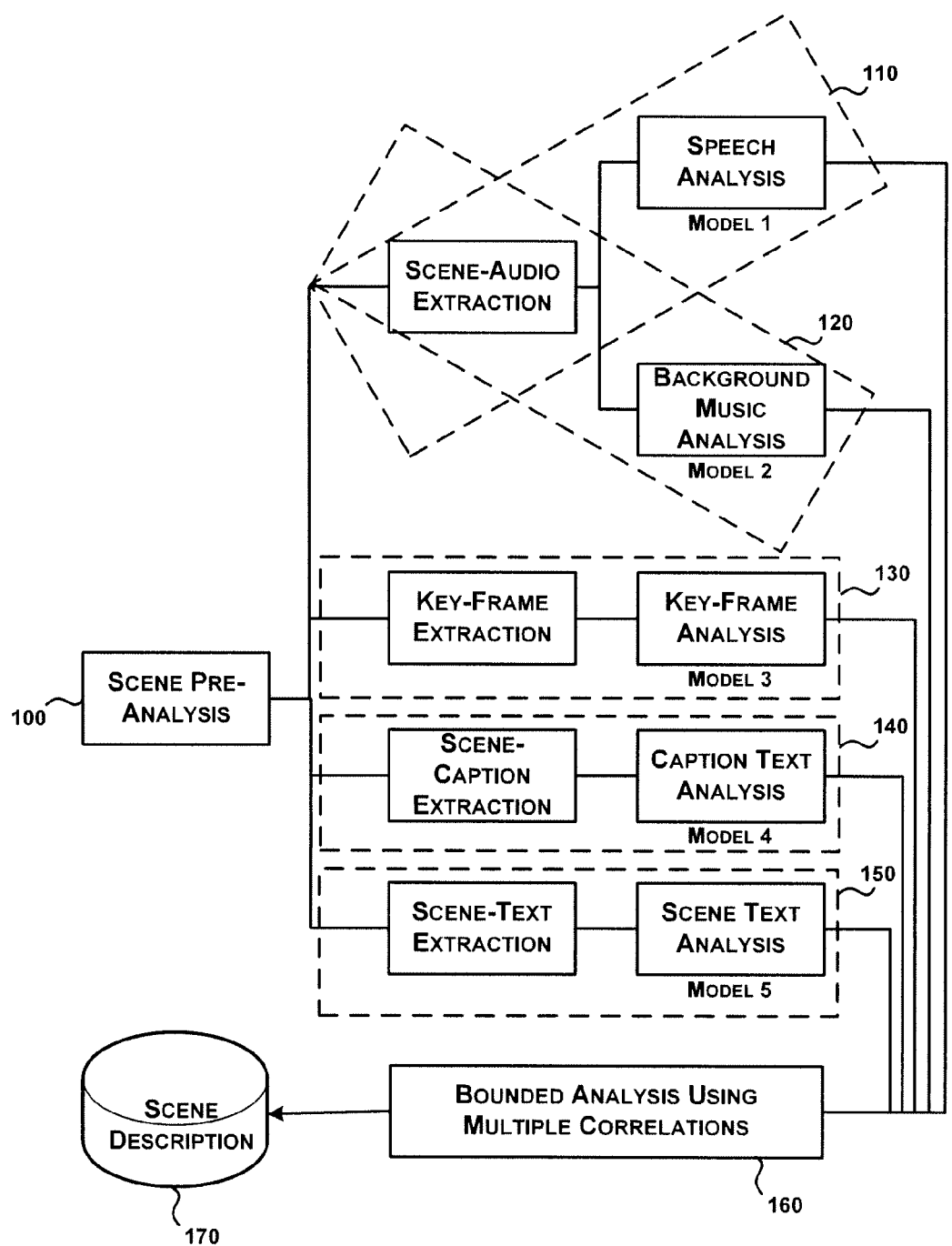
FIG. 1: AN ILLUSTRATIVE SCENE ANALYSIS

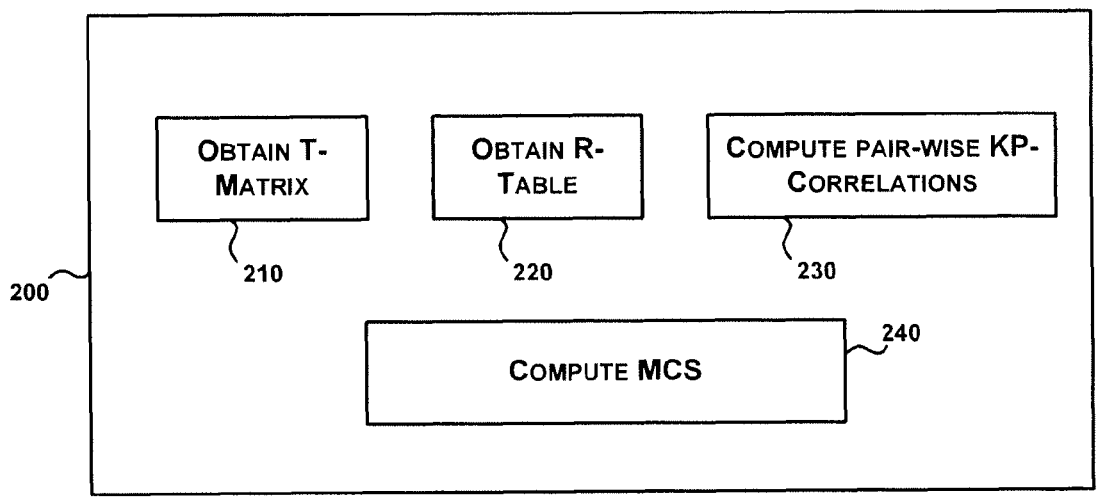
FIG. 2: BOUNDED ANALYSIS SYSTEM

| T-MATRIX | MODEL 1 | MODEL 2 | MODEL 3 | MODEL 4 | MODEL 5 |
|---|---|---|---|---|---|
| KC0 | 0.5 | 0 | 0.4 | 0 | 0.2 |
| KC1 | 0 | 0.3 | 0 | 0 | 0 |
| KC2 | 0 | 0.8 | 0 | 0.2 | 0 |
| KC3 | 0 | 0.5 | 0 | 0.6 | 0 |
| KC4 | 0 | 0.1 | 0.83 | 0 | 0 |
| KC5 | 0 | 0.1 | 0 | 0 | 0.7 |
| KC6 | 0 | 0 | 0.4 | 0 | 0.2 |
| KC7 | 0 | 0 | 0 | 0.3 | 0 |
| KC8 | 0.1 | 0 | 0 | 0 | 0.2 |
| KC9 | 0.3 | 0 | 0.5 | 0 | 0.6 |

300

| R TABLE | KC0 | KC1 | KC2 | KC3 | KC4 | KC5 | KC6 | KC7 | KC8 | KC9 |
|---|---|---|---|---|---|---|---|---|---|---|
| KC0 | 1 | 0.3 | 0.3 | 0.3 | 0.3 | 1 | 0.3 | 0.3 | 0.3 | 0.3 |
| KC1 | 0.3 | 1 | 0.3 | 1 | -1 | 0.3 | 0.3 | 0.3 | 0.3 | 1 |
| KC2 | 0.3 | 0.3 | 1 | 0.3 | 1 | -0.3 | 1 | 0.3 | 0.3 | -0.3 |
| KC3 | 0.3 | 1 | 0.3 | 1 | 0.3 | 1 | -1 | 0.3 | 1 | 1 |
| KC4 | 0.3 | -1 | 1 | 0.3 | 1 | -1 | 0.3 | 1 | 0.3 | 1 |
| KC5 | 1 | 0.3 | -0.3 | 1 | -1 | 1 | 0.3 | -1 | -1 | -1 |
| KC6 | 0.3 | 0.3 | 1 | -1 | 0.3 | 0.3 | 1 | 0.3 | -1 | 0.3 |
| KC7 | 0.3 | 0.3 | 0.3 | 0.3 | 1 | -1 | 0.3 | 1 | 0.3 | 0.3 |
| KC8 | 0.3 | 0.3 | 0.3 | 1 | 0.3 | -1 | -1 | 0.3 | 1 | 0.3 |
| KC9 | 0.3 | 1 | -0.3 | 1 | 1 | -1 | 0.3 | 0.3 | 0.3 | 1 |

310

FIG. 3: ILLUSTRATIVE DATA

ALGORITHM BOUNDED ANALYSIS

OBJECTIVE:
  TO ANALYZE THE EVALUATION OF A PLURALITY OF KEY-CONCEPTS WITH RESPECT TO A PLURALITY OF MODELS TO DETERMINE A MAXIMALLY CONSISTENT SUBSET OF SAID PLURALITY OF KEY-CONCEPTS;

INPUT:
  $SKC = \{KC_0, KC_1, \ldots, KC_{P-1}\}$ IS A PRE-DEFINED SET OF P KEY-CONCEPTS;
  $SM = \{M_0, M_1, \ldots, M_{N-1}\}$ IS A PRE-DEFINED SET OF N MODELS;

T MATRIX (P X N) – MODEL-SPECIFIC EVALUATION OF VARIOUS KEY-CONCEPTS;
                    P KEYWORDS EVALUATED WITH RESPECT TO N MODELS
  R TABLE (P X P) – A TABLE CONTAINING THE PAIR-WISE SEMANTIC EVALUATION OF KEY-CONCEPTS WITH VALUES BETWEEN -1 THROUGH 1; THE VALUE OF $R[I, J]$ AS 1 INDICATES THAT ITH AND JTH KEY-CONCEPTS ARE SEMANTICALLY CONSISTENT WHILE THE VALUE OF $R[I,J]$ AS -1 INDICATES THAT THE ITH AND JTH KEY-CONCEPTS ARE SEMANTICALLY INCONSISTENT;
  KP-CORR TABLE (P X P) – A TABLE CONTAINING PAIR-WISE CORRELATIONS WITH RESPECT TO T;

OUTPUT:
  $MCS = \{OKC_0, OKC_1, \ldots, OKC_{Q-1}\}$ A SUBSET OF SKC THAT IS MAXIMALLY CONSISTENT;

FUNCTION K-CORR ($KC_I$, $KC_J$)
{
  COMPUTE KEY-CONCEPT MEANS:
  $KCM_I$ = SUM ($T[I, K] / P$) FOR $1 <= K <= N$ FOR EACH KEY-CONCEPT $KC_I$ IN SKC;
  COMPUTE KEY-CONCEPT CO-VARIANCE MATRIX:
      $KCoV_{I,J}$ = SUM ((($T[I, K] - KCM_I$) * ($T[J, K] - KCM_J$)) / N) FOR $1 <= K <= N$;
  K-CORR ($KC_I$, $KC_J$) = NORMALIZE ($KCoV_{I,J}$ / (SQRT ($KCoV_{I,I}$) * SQRT ($KCoV_{J,J}$)));
}

FUNCTION M-CORR ($M_I$, $M_J$)
{
  COMPUTE MODELS MEANS:
  $MM_I$ = SUM ($T[K, I] / P$) FOR $1 <= K <= P$ FOR EACH MODEL $M_I$ IN SM;
  COMPUTE MODEL CO-VARIANCE MATRIX:
      $MCoV_{I,J}$ = SUM ((($T[K, I] - MM_I$) * ($T[K, J] - MM_J$)) / P) FOR $1 <= K < P$;
  M-CORR ($M_I$, $M_J$) = NORMALIZE ($MCoV_{I,J}$ / (SQRT ($MCoV_{I,I}$) * SQRT ($MCoV_{J,J}$)));
}

FUNCTION S-CORR ($KC_I$, $KC_J$)
{
  S-CORR ($KC_I$, $KC_J$) = $R[KC_I, KC_J]$;
}

FIG. 4: BOUNDED ANALYSIS FUNCTIONS

```
ALGORITHM BOUNDED ANALYSIS [CONTD.]

FUNCTION M-CORRP (KCI, KCJ)
{
    LET MODELI BE A SET OF MODELS THAT EVALUATE KCI BASED ON T;
    LET MODELJ BE A SET OF MODELS THAT EVALUATE KCJ BASED ON T;
    MODELIJ = INTERSECTION (MODELI, MODELJ);
    COMPUTE M-CORRP AS
        SUM (M-CORR (MI, MJ) / |MODELIJ|) FOR EACH PAIR MI AND MJ IN MODELIJ;
}
FUNCTION K-CORRP (KCA, KCB)
{
    COMPUTE K-CORRP AS
        SUM (OVER 1 <= I <= N) SUM (OVER 1 <= J <= N)
            IF ((M-CORRP (KCA, KCB) < 0) OR K-CORR (KCA, KCB) < 0))
                THEN SIGN = -1 ELSE SIGN = 1;
            TOTAL = TOTAL +(SIGN * ((T(A, I) * T(B, J)) / (N * N)) * ABS (K-CORR (KCA, KCB))
                    * ABS (M-CORRP (KCA, KCB)) ;
        NORMALIZE (TOTAL);
}
FUNCTION KP-CORR (KCA, KCB)
{
    COMPUTE KP-CORR AS
        SUM (OVER 1 <= I <= N) SUM (OVER 1 <= J <= N) (
            IF (M-CORR (MI, MJ) < 0 OR (S-CORR (KCA, KCB) < 0)
                THEN SIGN = -1 ELSE SIGN = 1;
            TOTAL = TOTAL + (((T(A, I) * T(B, J)) / (N * N)) * SIGN * ABS (M-CORR (MI, MJ)) *
                    ABS (S-CORR (KCA, KCB)));
        NORMALIZE (TOTAL * K-CORR (KCA, KCB));
}
FUNCTION A (S)
{
INPUT: S BE A SET OF KEY-CONCEPTS {KC0, KC1, ..., KCX} THAT IS A SUBSET OF SKC;
OUTPUT: A MEASURE OF S WITH RESPECT TO T;

OUTPUT = NORMALIZE ((WEIGHT BASED ON EXPONENTIAL FUNCTION OF |S|) *
        SUM (OVER KCA, KCB IN S WITH B > A)  (K-CORRP (KCA, KCB) * S-CORR (KCA, KCB)));
    ENSURE THAT SIGN OF K-CORRP AND S-CORR ARE ADDRESSED SEPARATELY FROM THEIR
    VALUES;
OR ALTERNATIVELY,

OUTPUT = NORMALIZE ((WEIGHT BASED ON EXPONENTIAL FUNCTION OF |S|) *
        SUM (OVER KCA, KCB IN S WITH B > A) (KP-CORR (KCA, KCB)));
    ENSURE THAT SIGN OF KP-CORR AND S-CORR ARE ADDRESSED SEPARATELY FROM THEIR
    VALUES;
}
```

FIG. 4A: AN APPROACH FOR MULTIPLE CORRELATION COMPUTATION

ALGORITHM BOUNDED ANALYSIS [CONTD.]

IDENTIFY MCS ()
{
INPUT: S BE A SET OF KEY-CONCEPTS, {KC0, KC1, ..., KCx}, THAT IS A SUBSET OF SKC;
OUTPUT: MCS THAT IS A MAXIMALLY CONSISTENT SUBSET OF S

STEP 1: LET SS1, SS2, ..., SSy BE Y SUBSETS OF S; THESE SUBSETS ARE RANDOMLY FORMED;

STEP 2: LET A(SSi) BE THE MEASURE ASSOCIATED WITH THE ITH SUBSET;

STEP 3: ARRANGE THE Y SUBSETS IN THE DESCENDING ORDER FOR THEIR MEASURE;

STEP 4: IF THE SUCCESSIVE MEASURES OF THE SUBSET WITH THE HIGHEST MEASURE IS WITHIN A PRE-DEFINED THRESHOLD OR A PRE-DEFINED NUMBER OF ITERATIONS HAVE BEEN COMPLETED, THEN IDENTIFY THE SUBSET WITH THE HIGHEST MEASURE AS MCS AND TERMINATE;

STEP 5: SELECT TOP Y/2 SUBSETS AND GENERATE THE ADDITIONAL Y/2 SUBSETS AS FOLLOWS:

STEP 5A: SELECT A SUBSET SSJ RANDOMLY FROM THE TOP Y/2 SUBSETS;
STEP 5B: RANDOMLY CHOOSE ONE OF THE OPERATIONS: INSERT, DELETE, OR MODIFY;
STEP 5C: IF INSERT IS THE CHOSEN OPERATION, INSERT A RANDOMLY SELECTED ELEMENT OF S THAT IS NOT ALREADY PRESENT IN SSJ INTO SSJ;
STEP 5D: IF DELETE IS THE CHOSEN OPERATION, DELETE A RANDOMLY SELECTED ELEMENT OF SSJ;
STEP 5E: IF MODIFY IS THE CHOSEN OPERATION, RANDOMLY SELECT AN ELEMENT OF SSJ, OBTAIN THE INDEX ASSOCIATED WITH THE RANDOMLY SELECTED ELEMENT, CHANGE RANDOMLY THE OBTAINED INDEX, AND REPLACE THE SELECTED ELEMENT WITH AN ELEMENT FROM S BASED ON THE CHANGED INDEX;

STEP 6: GO TO STEP 2;

END;

FIG. 4B: AN APPROACH FOR MAXIMALLY CONSISTENT SUBSET IDENTIFICATION

| M-CORR | MODEL 1 | MODEL 2 | MODEL 3 | MODEL 4 | MODEL 5 |
|---|---|---|---|---|---|
| MODEL 1 | 1 | -0.37989 | 0.340134 | -0.31422 | 0.318716 |
| MODEL 2 | -0.37989 | 1 | -0.40716 | 0.524583 | -0.42392 |
| MODEL 3 | 0.340134 | -0.40716 | 1 | -0.42983 | 0.078969 |
| MODEL 4 | -0.31422 | 0.524583 | -0.42983 | 1 | -0.44088 |
| MODEL 5 | 0.318716 | -0.42392 | 0.078969 | -0.44088 | 1 |

500

| KP-CORR | KC0 | KC1 | KC2 | KC3 | KC4 | KC5 | KC6 | KC7 | KC8 | KC9 |
|---|---|---|---|---|---|---|---|---|---|---|
| KC0 | 0.037448 | 0.000274 | 0.000607 | 0.000278 | 0.00609 | 0.009662 | 0.004133 | 0.000283 | 0.001856 | 0.011205 |
| KC1 | 0.000274 | 0.0036 | 0.003374 | 0.008708 | -0.0018 | 0.000483 | 0.000198 | 0.000308 | 9.968948 | 0.001082 |
| KC2 | 0.000607 | 0.003374 | 0.036957 | 0.009893 | 0.005355 | -0.00143 | 0.001804 | 0.001457 | 0.000275 | -0.00067 |
| KC3 | 0.000278 | 0.008708 | 0.009893 | 0.042695 | 0.001403 | 0.00414 | -0.00148 | 0.003002 | 0.000771 | 0.000774 |
| KC4 | 0.00609 | -0.0018 | 0.005355 | 0.001403 | 0.029924 | -0.00505 | 0.004873 | 0.001338 | 0.000526 | 0.02469 |
| KC5 | 0.009662 | 0.000483 | -0.00143 | 0.00414 | -0.00505 | 0.021613 | 0.002225 | -0.00115 | -0.00718 | -0.0249 |
| KC6 | 0.004133 | 0.000198 | 0.001804 | -0.00148 | 0.004873 | 0.002225 | 0.011452 | 0.000191 | -0.00261 | 0.006603 |
| KC7 | 0.000283 | 0.000308 | 0.001457 | 0.003002 | 0.001338 | -0.00115 | 0.000191 | 0.0036 | 0.000101 | 0.000324 |
| KC8 | 0.001856 | 9.968948 | 0.000275 | 0.000771 | 0.000526 | -0.00718 | -0.00261 | 0.000101 | 0.003054 | 0.003162 |
| KC9 | 0.011205 | 0.001082 | -0.00067 | 0.000774 | 0.02469 | -0.0249 | 0.006603 | 0.000324 | 0.003162 | 0.058483 |

510

520

TOP 25 MCS IDENTIFICATION COMPUTATIONS:
NOTE – 0 THROUGH 9 BELOW DENOTES FOR KEY-CONCEPTS KC0 THROUGH KC9 RESPECTIVELY

MCS ASSESSMENT / IDENTIFIED MCS

```
(1)  0.005380:[0,2,3,4,9];        (2)  0.005272:[0,2,3,4,6,9];
(3)  0.005140:[0,3,4,9];          (4)  0.005139:[0,2,4,9];
(5)  0.005122:[4,9];              (6)  0.005042:[0,4,6,9];
(7)  0.005038:[0,1,2,3,4,6,9];    (8)  0.005037:[0,1,2,3,4,9];
(9)  0.005030:[0,2,4,6,9];        (10) 0.005011:[2,3,4,9];
(11) 0.004923:[0,3,4,6,9];        (12) 0.004905:[0,2,3,4,6,7,9];
(13) 0.004887:[0,2,3,4,7,9];      (14) 0.004884:[0,2,3,4,8,9];
(15) 0.004831:[0,2,3,4,6,8,9];    (16) 0.004779:[0,1,2,3,4,6,7,9];
(17) 0.004747:[3,4,9];            (18) 0.004738:[2,3,4,6,9];
(19) 0.004728:[2,4,9];            (20) 0.004707:[0,1,2,3,4,6,8,9];
(21) 0.004698:[0,1,2,3,4,7,9];    (22) 0.004691:[0,1,2,3,4,8,9];
(23) 0.004598:[0,1,3,4,9];        (24) 0.004594:[1,2,3,4,9];
(25) 0.004586:[0,2,3,4,6,7,8,9];
```

FIG. 5: ILLUSTRATIVE COMPUTATIONS

SYSTEM AND METHOD FOR BOUNDED ANALYSIS OF MULTIMEDIA USING MULTIPLE CORRELATIONS

FIELD OF THE INVENTION

The present invention relates to multimedia analysis in general and more particularly, multimedia analysis using multiple techniques. Still more particularly, the present invention is related to a system and method for bounded analysis of a multimedia content using multiple correlations to determine a maximally consistent description of the content.

BACKGROUND OF THE INVENTION

Content based multimedia search has gained a lot of attention with the rapid increase in multimedia quantity and quality. As the ability to broadcast video content (including games) has gone beyond television to the Internet and mobile phones, video advertising is becoming an attractive and plausible source of revenue. While today video advertising accounts for only a minuscule proportion of media budgets, it presents a significant opportunity for advertisers to extend the reach of their campaigns with compelling content. This demands to select relevant advertisements for targeting viewers based on the video content. There is a definitive need to determine the deeper semantics of the video and to select relevant advertisements based on the semantics. Presently, most of the video search techniques analyze textual information such as file name, web page address, and surrounding texts, and uses the same for providing metadata description for a video. Such a metadata is too abstract and does not describe the whole video in a semantically consistent manner. Moreover, annotation using such a metadata of a video is inappropriate and incomplete without taking the semantics from the audio, important objects in the video including prominent faces, scene texts, text captions, and other related information about the video. In order to achieve this kind of exhaustive and comprehensive semantics based annotation, it is required to deploy multiple multimedia analysis techniques and combine them in the most appropriate manner to arrive at a maximally consistent annotation of the video. The present invention addresses the issue of combining the results of the multiple multimedia analysis techniques in such a manner that the overall combined description of a multimedia is consistent and comprehensive.

DESCRIPTION OF RELATED ART

U.S. Pat. No. 7,346,621 to Zhang; Benyu (Beijing, CN), Zeng; Hua-Jun (Beijing, CN), Ma; Wei-Ying (Beijing, CN), Xi; Wensi (Beijing, CN), Chen; Zheng (Beijing, CN), Fox; Edward A. (Blacksburg, Va.) for "Method and system for ranking objects based on intra-type and inter-type relationships" (issued on Mar. 18, 2008 and assigned to Microsoft Corporation (Redmond, Wash.)) describes a method and system for ranking objects based on relationships with objects of a different object type. The ranking system defines an equation for each attribute of each type of object and iteratively calculates the attribute values for the objects using the equations until the attribute values converge on a solution. The ranking system then ranks objects based on attribute values.

U.S. Pat. No. 7,305,389 to Zeng; Hua-Jun (Beijing, CN), Zhang; Benyu (Beijing, CN), Chen; Zheng (Beijing, CN), Ma; Wei-Ying (Beijing, CN), Hon; Hsiao-Wuen (Bellevue, Wash.), Cook; Daniel B. (Seattle, Wash.), Hirschler; Gabor (Issaquah, Wash.), Fries; Karen (Seattle, Wash.), Samuelson; Kurt (Issaquah, Wash.) for "Content propagation for enhanced document retrieval" (issued on Dec. 4, 2007 and assigned to Microsoft Corporation (Redmond, Wash.)) describes systems and methods providing computer-implemented content propagation for enhanced document retrieval. Metadata that is proximally located to reference information is extracted from the one or more sources of data. Relevance between respective features of the metadata to content of associated ones of the one or more documents is calculated and used for indexing purposes.

U.S. Pat. No. 7,184,959 to Gibbon; David Crawford (Lincroft, N.J.), Huang; Qian (Rockville, Md.), Liu; Zhu (Middletown, N.J.), Rosenberg; Aaron Edward (Berkley Heights, N.J.), Shahraray; Behzad (Freehold, N.J.) for "System and method for automated multimedia content indexing and retrieval" (issued on Feb. 27, 2007 and assigned to AT&T Corp. (New York, N.Y.)) describes a system and method for automatically indexing and retrieving multimedia content based on the analysis of audio, visual, and text components, identifying a topic and a speaker, and generating a summary of multimedia events.

U.S. Pat. No. 6,941,321 to Schuetze; Hinrich (San Francisco, Calif.), Chen; Francine R. (Menlo Park, Calif.), Pirolli; Peter L. (San Francisco, Calif.), Pitkow; James E. (Palo Alto, Calif.), Chi; Ed H. (Palo Alto, Calif.), Li; Jun (Seattle, Wash.) for "System and method for identifying similarities among objects in a collection" (issued on Sep. 6, 2005 and assigned to Xerox Corporation (Stamford, Conn.)) describes a system and method for browsing, retrieving, and recommending information from a collection that uses multi-modal features of the documents in the collection, as well as an analysis of users' prior browsing and retrieval behavior. The system and method are premised on various disclosed methods for quantitatively representing documents in a document collection as vectors in multi-dimensional vector spaces, quantitatively determining similarity between documents, and clustering documents according to those similarities.

U.S. Pat. No. 6,366,296 to Boreczky; John S. (San Leandro, Calif.), Girgensohn; Andreas (Menlo Park, Calif.), Foote; Jonathan T. (Menlo Park, Calif.) for "Media browser using multimodal analysis" (issued on Apr. 2, 2002 and assigned to Xerox Corporation (Stamford, Conn.)) describes a media browser, graphical user interface, and a method for browsing a media file wherein a user selects at least one feature in a media file and is provided with information regarding the existence of the selected feature in the media file. Features in a media file, such as a speaker's identity, applause, silence, motion, or video cuts, are preferably automatically time-wise evaluated in the media file using known methods. Metadata generated based on the time-wise feature evaluation are preferably mapped to confidence score values that represent a probability of a corresponding feature's existence in the media file.

"The Effectiveness of Concept Based Search for Video Retrieval" by Hauff, C., Aly, R., and Hiemstra, D. (appeared in the Proceedings of Workshop Information Retrieval (FGIR 2007), 24-26 Sep. 2007, Halle, Germany) investigates how a small number of high-level concepts can be effectively used for searching a video material. Further, the paper also discusses about how to combine evidence from single concept detectors into final search results.

"A Multimodal and Multilevel Ranking Framework for Content-Based Video Retrieval" by Hoi, S. C. H. and Lyu, M. R. (appeared in the Proceedings of the IEEE International Conference on ICASSP 2007 (Acoustics, Speech and Signal Processing, 2007), Honolulu, Hi., April 2007) describes an approach for ranking search results effectively with combinations of multimodal resources. The main idea of this approach is to represent videos by graphs and learn harmonic ranking functions through fusing multimodal resources over these graphs smoothly.

"Towards Content-Based Relevance Ranking for Video Search" by Lai, W., Hua, X., and Ma, W. (appeared in the Proceedings of ACM International Conference on Multimedia (ACM MM), 23-27 Oct., 2006, Santa Barbara, Calif., USA) describes an integrated ranking approach based on video metadata and content information that includes semantic descriptions and associated speech data. Videos are indexed based on metadata and video shots are indexed based on content information separately, and these two rank lists are merged to form a final ranking.

"Modal Keywords, Ontologies, and Reasoning for Video Understanding" by Jaimes, A., Tseng, B. L., and Smith, J. R. (appeared in the Proceedings of the International Conference on Image and Video Retrieval, Jul. 24-25, 2003, Urbana, Ill., USA) describes the idea of model keywords that represent perceptual concepts and describes a method to automatically classify keywords from speech recognition, queries, or related text into perceptual categories using word analysis techniques.

"Multimodal Video Indexing: A Review of the State-of-the-art" by Snoek, C. and Worring, M. (appeared as a Technical Report 2001-20, Intelligent Sensory Information Systems Group, University of Amsterdam, 2001) surveys several approaches for effective indexing that are based on multimodal analysis.

The known systems do not address the various issues related to the assessment of support for the identification of key-concepts in a multimedia from multiple techniques that ensures the description of the multimedia using a comprehensive and consistent set of key-concepts. The present invention provides a system and method for addressing these issues in order to effectively arrive at a maximal consistent description of the multimedia content.

SUMMARY OF THE INVENTION

The primary objective of the invention is to determine a maximally consistent subset of key-concepts from a set of key-concepts to describe a multimedia content wherein each key-concept of the set of key-concepts is identified using a one or more techniques.

One aspect of the invention is to perform bounded analysis on a multimedia content.

Another aspect of the invention is to analyze a set of key-concepts with respect to a set of techniques (also called as models) using multiple correlations.

Yet another aspect of the invention is to perform key-concept specific correlations.

Another aspect of the invention is to perform model specific correlations.

Yet another aspect of the invention is to perform semantic correlations.

Another aspect of the invention is to determine a near-optimal maximally consistent subset of key-concepts.

BRIEF DESCRIPTION OF THE DRAWINGS

FIG. 1 depicts an illustrative scene analysis.
FIG. 2 depicts an illustrative Bounded Analysis System.
FIG. 3 depicts illustrative data.
FIG. 4 depicts an illustrative Bounded Analysis functions.

FIG. 4a provides an approach for Multiple Correlation computation.
FIG. 4b provides an approach for Maximally Consistent Subset identification.
FIG. 5 depicts illustrative computations.

DETAILED DESCRIPTION OF THE PREFERRED EMBODIMENTS

Key-concepts are an important aspect of the annotation of a multimedia content. One of the objectives of the annotation of a multimedia content is to help (a) multimedia categorization; (b) multimedia retrieval; and (c) multimedia targeting. The ultimate multimedia delivery would be to human beings and hence, annotating the multimedia content with relevant key-concepts helps this objective in a natural manner. A typical multimedia content could be analyzed from multiple perspectives leading to its characterization and categorization along the multiple dimensions. However, a generic analysis of multimedia content is a very tough problem leading to ambiguous, incomplete, and in some cases inconsistent annotation. In order to address this issue, the present invention proposes a bounded analysis of multimedia content. The bound could get imposed by pre-deciding the perspective(s) and dimension(s) for analysis, and one of the ways to achieve this bounding is to rely on a thoughtfully designed set of key-concepts.

FIG. 1 depicts an illustrative scene analysis. Here, a scene is a multimedia content comprising audio (both speech and background music), video, text based captions, and embedded scene text. While, as mentioned above, bounded analysis reduces multimedia analysis complexity, it cannot very much help in reducing ambiguity and inconsistency. In order to contain ambiguity and inconsistency, this invention proposes to deploy multiple analysis techniques (also called as models). In other words, a bounded analysis is performed on the multimedia content under consideration with respect to multiple models. To begin with, the given multimedia content (also referred to as a scene) is prepared and pre-analyzed (100). The pre-analyzed scene is processed to extract audio portion of the content comprising of speech and background music. The speech portion is analyzed with respect to a speech-specific model (Model 1) (110) while the background music portion of the content is analyzed with respect to a music-specific model (Model 2) (120). Similarly, one or more key frames are extracted and analyzed with respect to an image-specific model (Model 3) (130). And, scene caption is extracted and the text portion of the caption is analyzed using a text-specific model (Model 4) (140). Finally, the scene text (that is, text embedded in the video) is extracted and is analyzed using a text-specific model (Model 5) (150). The outcome of these multi-model analyses of the given multimedia content is correlated along multiple dimensions: concept based correlation, model based correlation, and semantic based correlation (160). The output of the bounded analysis is used in the process of scene annotation (170).

FIG. 2 provides an overview of the Bounded Analysis System. The main objective of the system is to help annotate a multimedia content in a most plausible manner. The pre-processing and multi-dimensional analysis of the multimedia content results in the generation of T Matrix. The T Matrix is the result of the analysis of the multimedia content using multiple models. The bounded analysis requires the identification of a pre-defined set of key-concepts and analyzing the given multimedia content with respect to this pre-defined set of key-concepts. T Matrix is essentially a matrix of key-concepts and models providing the evaluation of a key-concept with respect to a model (210). Note that not all of these key-concepts are consistent with respect to each of the key-concepts. R Table characterizes this pair-wise inconsistency among key-concepts (220) and helps in the ultimate objective the Bounded Analysis System in identifying the most plausible annotation of the given multimedia content. Given a T Matrix, the pair-wise correlation of the key-concepts (KP-Correlations) is computed (230). Such a KP-Correlation captures (a) how good a model is; and (b) how consistently a key-concept can be determined given a multimedia content. Finally, based on pair-wise key-concept correlations and further using model-specific correlations and semantic correlations, a maximally consistent subset of key-concepts is determined (240).

FIG. 3 depicts a typical data related to Bounded Analysis System. There are two distinct kinds of data: One is called as T Matrix (300) and the other is called as R Table (310). As can be observed from the figure, T Matrix is a matrix of size N×P wherein N is the number of key-concepts under consideration and P is the number of models used to analyze the input multimedia content. The value of T[I, J] is the analysis outcome of the given multimedia content for Ith key-concept using Jth model and is typically in the range between 0 and 1 (both included). R Table, on the other hand, distinctly identifies the semantic inconsistency between key-concept pairs. For example, the value of R[I, J} as 1 indicates that Ith and Jth key-concepts are positively related to each other; that is, they are together semantically consistency. Similarly, the value of R[I, J] as −1 indicates that Ith and Jth key-concepts are together semantically inconsistent.

FIG. 4 depicts an illustrative Bounded Analysis correlation functions. The main objective of Bounded Analysis algorithm is to analyze the evaluation of a plurality of key-concepts with respect to a plurality of models to determine a maximally consistent subset of key-concepts. The inputs are as follows:

SKC is a pre-defined set of P key-concepts; and SM is a pre-defined set of N Models;

T Matrix is a P×N matrix that depicts model-specific evaluation sof an input multimedia content. That is, P key-concepts are evaluated using N models with respect to the multimedia content;

R Table is a P×P matrix that depicts the semantic consistency between each pair of key-concepts with values in between −1 and 1. The value of R[I, J] as 1 indicates that Ith and Jth key-concepts are semantically consistent while the value of R[I, J] as −1 indicates that Ith and Jth key-concepts are semantically inconsistent.

The computed structure is as follows:

KP-Corr is a P×P matrix containing pair-wise computed correlation values.

The output is as follows: MCS is a subset of SKC that is maximally consistent.

FIG. 4 defines three functions, K-CORR, M-CORR, and S-CORR, that form part of the multi-correlation based identification of annotation of a multimedia content.

The function K-CORR computes pair-wise key-concept co-variance matrix based on T Matrix using key-concept means:

$Ith$ key-concept mean=$KCMi$=Sum($T[I,K]/P$) for $1<=K<=N$;

Co-variance between $Ith$ and $Jth$ key-concepts=$KCOVi,j$=Sum((($T[I,K]-KCMi$)*($T[J,K]-KCMj$))/$N$) for $1<=K<=N$ Finally, K-CORR between Ith and Jth key-concepts is computed as follows:

Noramlize ($KCOVi,j/$(Sqrt($KCOVi,i$)*Sqrt($KCOVj,j$)));

Similarly, the function M-CORR computes pair-wise model co-variance matrix based on T matrix model means:

$Ith$ model mean=$MMi$=Sum($T[K,I]/P$) for $1<=K<=P$;

Co-variance between $Ith$ and $Jth$ models=$MCOVi,j$=Sum((($T[K,I]-MMi$)*($T[K,J]-MMj$))/$P$) for $1<=K<=P$;

Finally, M-CORR M-CORR (Mi, Mj) between Ith and Jth models is computes as

Normalize($MCOVi,j/$(Sqrt($MCOVi,i$)*Sqrt($MCOVj,j$)));

S-CORR, semantic correlation, between Ith and Jth key-concepts is computed based on R Table as R[KCi, KCj].

FIG. 4a provides an approach for multiple correlation computation. Given two key-concepts, KCi and KCj, let MODELi be a set of models that successfully evaluate KCi based on T Matrix. And, similarly, MODELj be a set of models that successfully evaluate KCj based on T Matrix. MODELi,j is the intersection of two sets, MODELi and MODELj.

Compute M-CORRP with respect to key-concepts, KCi and KCj as

Sum(M-CORR(Mi, Mj)/|MODELi,j|) for each pair Mi and Mj in MODELi,j.

K-CORRP between key-concepts, KCa and KCb as (Sum(over $1<=I<=N$)Sum(over $1<=J<=N$)(($T(A,I)$ *$T(B,J))/(N*N)$))*K-CORR ($KCa,KCb$)*M-CORRP($KCa,KCb$);

Ensure that the sign of K-CORRP and M-CORRP are addressed separately from their values and the sum is normalized appropriately.

Similarly, define KP-CORR (pair-wise correlation) between key-concepts, KCa and KCb as (Sum(over $1<=I<=N$)Sum(over $1<=J<=N$)(($T(a, i)*T(b, j))/(N*N)$)*M-CORR($Mi,Mj$)*S-CORR ($KCa,KCb$));

*K-CORR (KCa, KCb);

Ensure that the sign of K-CORR, M-CORR, and S-CORR are addressed separately from their values and the sum is normalized appropriately.

Finally, the overall assessment of a set S of key-concepts, A(S), is defined in the following two ways:

Let S be a set of key-concepts {KC0, KC1, . . . , KCx} that is a subset of SKC.

Output is a measure or assessment of S with respect to T:

Output=Normalize(Weight based on exponential function of |S|)*(Sum(over $KCa,KCb$ in $S$ with $b>a$) ((K-CORRP($KCa,KCb$)*S-CORR($KCa,KCb$)));  Approach 1:

Ensure that the sign of K-CORRP and S-CORR are addressed separately from their values and the sum is normalized appropriately.

Output=Normalize(Weight based on exponential function of |S|)*(Sum(over $KCa,KCb$ in $S$ with $b>a$) (KP-CORR($KCa,KCb$)));  Approach 2:

Ensure that the sign of KP-CORR and S-CORR are addressed separately from their values and the sum is normalized appropriately.

FIG. 4b provides an approach for maximally consistent subset identification. Let S be a set of key-concepts {KC0, KCa, ..., KCx} that is a subset of S; The output is MCS that is a maximally consistent subset of S. Let SS1, SS2, ..., SSy be the Y subsets of S that are randomly formed (Step 1). Let A(SSi) be the measure associated with the subset SSi (Step 2). Arrange Y subsets in the descending order of their measure (Step 3). If the successive measures of the subset with the highest measure is within a pre-defined threshold or a pre-defined number of iterations have been completed, then identify MCS as the subset with the highest measure and terminate (Step 4). Select top Y/2 subsets and generate the additional Y/2 subsets as follows (Step 5): Select a subset SSj randomly from the top Y/2 subsets (Step 5a). Randomly choose one of the operations: Insert, Delete, or Modify (Step 5b). If Insert is the chosen operation, insert a randomly selected element of S that is not already present in SSj into SSj (Step 5c). If Delete is the chosen operation, delete a randomly selected element of SSj (Step 5d). If Modify is the chosen operation, Randomly select an element of SSj, Obtain the index associated with the randomly selected element, Change randomly the obtained index, and Replace the selected element with an element from S based on the changed index (Step 5e). Repeat Steps 2 though 5 until MCS is identified (Step 6).

FIG. 5 depicts illustrative computations. These computations are based on data depicted in FIG. 3. The overall assessment of a set of key-concepts, based on the analysis of a given multimedia content with respect to various models, involves computation of multiple correlations: Model specific correlation, Key-Concept specific correlation, and semantic correlation. Model specific correlation (M-CORR) indicates how two models correlate with respect to each other given a set of key-concepts (500). Similarly, pair-wise key-concept specific correlations (KP-CORR) depict how the evaluation of two key-concepts with respect to a set of models correlates with each other (510). Finally, semantic correlation computation is directly based on R-Table (310). A set of key-concepts are assessed based on multiple correlation computations and are ranked (520), and the set with the top ranking value is used to semantically describe the given multimedia content.

Thus, a system and method for bounded analysis of multimedia using multiple correlations is disclosed. Although the present invention has been described particularly with reference to the figures, it will be apparent to one of the ordinary skill in the art that the present invention may appear in any number of systems that identifies a maximally consistent subset from a given set wherein the elements of the set have been evaluated with respect to a plurality of evaluation techniques. It is further contemplated that many changes and modifications may be made by one of ordinary skill in the art without departing from the spirit and scope of the present invention.

What is claimed is:

1. A method for the determination of a plurality of maximally consistent key-concepts for semantics based annotating of a multimedia content based on a plurality of key-concepts, a plurality of models, and a plurality of semantic key-concept pairs, wherein said plurality of maximally consistent key-concepts is a subset of said plurality of key-concepts, said method comprising:

receiving a plurality of key-concept evaluations of said multimedia content with respect to said plurality of key-concepts and said plurality of models;

computing a plurality of key correlations based on said plurality of key-concept evaluations and said plurality of key-concepts;

computing a plurality of model correlations based on said plurality of key-concept evaluations and said plurality of models;

computing a plurality of semantic correlations based on said plurality of semantic key-concept pairs;

computing a plurality of model correlation P values based on said plurality of model correlations and said plurality of models;

computing a plurality of key correlation P values based on said plurality of model correlation P values and said plurality of key correlations;

computing a plurality of pair-wise key correlations based on said plurality of key correlations, said plurality model correlations, and said plurality of semantic correlations;

computing a plurality of assessments based on said plurality of key-concepts, said plurality of key correlation P values, said plurality of pair-wise key correlations, and said plurality of semantic correlations; and computing said plurality of maximally consistent key-concepts based on said plurality of key-concepts and said plurality of assessments.

2. The method of claim 1, wherein said method of computing said plurality of key correlations further comprises:

computing a plurality of key-concept means based on said plurality of key-concept evaluations;

computing a plurality of key-concept covariance values based on said plurality of key-concept evaluations and said plurality of key-concept means; and computing said plurality of key correlations based on said plurality of key-concept covariance values.

3. The method of claim 1, wherein said method of computing said plurality of model correlations further comprises:

computing a plurality of model means based on said plurality of key-concept evaluations;

computing a plurality of model covariance values based on said plurality of key-concept evaluations and said plurality of model means; and computing said plurality of model correlations based on said plurality of model covariance values.

4. The method of claim 1, wherein said method of computing said plurality of model correlation P values further comprises:

determining key-concept I value based on said plurality of key-concepts;

determining key-concept J value based on said plurality of key-concepts;

determining a plurality of model I values based on said plurality of key-concept evaluations, wherein a model of said plurality of model I values evaluates said key-concept I value as per said plurality of key-concept evaluations;

determining a plurality of model J values based on said plurality of key-concept evaluations, wherein a model of said plurality of model J values evaluates said key-concept J value as per said plurality of key-concept evaluations;

computing a plurality model IJ values based on said plurality of model I values and said plurality of model J values; and computing a model correlation P value of said plurality of model correlation P values based on said plurality of model correlations and said plurality of model IJ values.

5. The method of claim 1, wherein said method of computing said plurality of key correlation P values further comprises:

determining a key-concept A value based on said plurality of key-concepts;

determining a key-concept B value based on said plurality of key-concepts;

determining a total number of models based on said plurality of models;
determining an I value based on said total number of models;
determining a J value based on said total number of models;
computing a sign value based on said plurality of model correlation P values, said plurality of key correlations, said key-concept A value, and said key-concept B value;
computing a sub value of a plurality of sub values based on said sign value, said I value, said J value, said key-concept A value, said key-concept B value, said plurality of key-concept evaluations, said total number of models, said plurality of model correlation P values, and said plurality of key correlations; and
computing a key correlation P value of said plurality of key correlation P values based on said plurality of sub values.

6. The method of claim 1, wherein said method of computing said plurality of pair-wise key correlations further comprises:
determining a key-concept A value based on said plurality of key-concepts;
determining a key-concept B value based on said plurality of key-concepts;
determining a total number of models based on said plurality of models;
determining an I value based on said total number of models;
determining a J value based on said total number of models;
determining a model I value based on said plurality of models and said I value;
determining a model J value based on said plurality of models and said J value;
computing a sign value based on said plurality of model correlations, said plurality of semantic correlations, said key-concept A value, and said key-concept B value;
computing a sub value of a plurality of sub values based on said sign value, said I value, said J value, said key-concept A value, said key-concept B value, said plurality of key-concept evaluations, said total number of models, said plurality of model correlations, and said plurality of semantic correlations; and
computing a pair-wise key correlation of said plurality of pair-wise key correlations based on said plurality of sub values, said plurality of key correlations, said key-concept A and said key-concept B.

7. The method of claim 1, wherein said method of computing said plurality of assessments further comprises:
determining a plurality of subset key-concepts of said plurality of key-concepts, wherein said plurality of subset key-concepts is a subset of said plurality of key-concepts;
determining a key-concept A of said plurality of subset key-concepts;
determining a key-concept B of said plurality of subset key-concepts;
computing a sub value of a plurality of sub values based on said key-concept A, said key-concept B, said plurality of key correlation P values, and said plurality of semantic correlations;
computing a sub 1 value of a plurality of sub 1 values based on said key-concept A, said key-concept B, and said plurality of pair-wise key correlations;
computing an assessment of said plurality of assessments based on said plurality of sub values and said plurality of subset key-concepts; and
computing an assessment of said plurality of assessments based on said plurality of sub 1 values and said plurality of subset key-concepts.

8. The method of claim 1, wherein said method of computing said plurality of maximally consistent key-concepts further comprises:
determining a plurality of subset key-concepts of said plurality of key-concepts, wherein said plurality of subset key-concepts is a subset of said plurality of key-concepts;
computing an assessment of a plurality of subset assessments based on said plurality of subset key-concepts and said plurality of assessments; and
computing said plurality of maximally consistent key-concepts based on said plurality of subset key-concepts and said plurality of subset assessments using a variation of genetic algorithm.

* * * * *